US009307470B2

(12) United States Patent
Chan et al.

(10) Patent No.: US 9,307,470 B2
(45) Date of Patent: Apr. 5, 2016

(54) SYSTEM AND METHOD FOR SINGLE RADIO HANDOVER

(71) Applicants: Futurewei Technologies, Inc., Plano, TX (US); ELECTRONICS AND TELECOMMUNICATIONS RESEARCH INSTITUTE, Daejeon (KR)

(72) Inventors: Hinghung Anthony Chan, Plano, TX (US); Hyunho Park, Daejeon (KR); Hyeong Ho Lee, Daejeon (KR)

(73) Assignees: Futurewei Technologies, Inc., Plano, TX (US); Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 13/937,969

(22) Filed: Jul. 9, 2013

(65) Prior Publication Data

US 2014/0016613 A1    Jan. 16, 2014

Related U.S. Application Data

(60) Provisional application No. 61/669,966, filed on Jul. 10, 2012.

(51) Int. Cl.
| | |
|---|---|
| *H04W 36/18* | (2009.01) |
| *H04W 36/00* | (2009.01) |
| *H04W 36/14* | (2009.01) |
| *H04W 84/12* | (2009.01) |
| *H04W 88/06* | (2009.01) |

(52) U.S. Cl.
CPC ............ *H04W 36/18* (2013.01); *H04W 36/005* (2013.01); *H04W 36/14* (2013.01); *H04W 84/12* (2013.01); *H04W 88/06* (2013.01)

(58) Field of Classification Search
None
See application file for complete search history.

(56) References Cited

U.S. PATENT DOCUMENTS

| | | | |
|---|---|---|---|
| 2008/0096558 A1* | 4/2008 | Liu et al. | 455/435.2 |
| 2009/0290556 A1* | 11/2009 | Taaghol | 370/331 |

(Continued)

FOREIGN PATENT DOCUMENTS

| | | |
|---|---|---|
| KR | 20120026441 A | 3/2012 |
| WO | 2012048487 A1 | 4/2012 |
| WO | 2012058608 A2 | 5/2012 |

OTHER PUBLICATIONS

H. Park, J. Jee, H. Chan, "Simplified Protocol Header for IEEE 802.21c", 21-12-0047-01-srho-simplified-protocol-header-for-ieee-802.21c, IEEE, May 2, 2012, entire document.*

(Continued)

*Primary Examiner* — Chirag Shah
*Assistant Examiner* — Suk Jin Kang
(74) *Attorney, Agent, or Firm* — Slater & Matsil, L.L.P.

(57) ABSTRACT

Single radio handovers (SRHOs) between heterogonous networks can be facilitated using several techniques. One such technique includes activating a receiver of a target radio interface in a mobile node without activating a transmitter of the target radio interface, thereby allowing the mobile node to perform target network discovery while the transmitter of the target radio interface remains deactivated. Another such technique includes encapsulating link-layer discovery frames into media independent handover frames (MIH), and then tunneling the MIH frames over a tunnel extending through the source network. This may allow the MN to achieve various handover related tasks without activating the target radio link. Another technique includes establishing a schedule (or delay period) for synchronizing deactivation of the source radio interface with activation of the transmitter in the target radio interface.

23 Claims, 12 Drawing Sheets

(56) References Cited

U.S. PATENT DOCUMENTS

| | | | |
|---|---|---|---|
| 2010/0040020 A1* | 2/2010 | Chen | 370/331 |
| 2010/0054207 A1* | 3/2010 | Gupta et al. | 370/331 |
| 2010/0111040 A1* | 5/2010 | Perras | 370/331 |
| 2010/0281249 A1* | 11/2010 | Das et al. | 713/151 |
| 2010/0304737 A1* | 12/2010 | Jain et al. | 455/426.1 |
| 2011/0002302 A1* | 1/2011 | Ding et al. | 370/331 |
| 2011/0032901 A1 | 2/2011 | Xiang et al. | |
| 2011/0047592 A1* | 2/2011 | Feder et al. | 726/1 |
| 2011/0058531 A1* | 3/2011 | Jain et al. | 370/331 |
| 2011/0176511 A1* | 7/2011 | Sayeedi | 370/331 |
| 2011/0206002 A1* | 8/2011 | Jeon et al. | 370/331 |
| 2011/0216744 A1* | 9/2011 | Taaghol et al. | 370/332 |
| 2011/0223885 A1* | 9/2011 | Salkintzis et al. | 455/411 |
| 2012/0108277 A1* | 5/2012 | Chan et al. | 455/501 |
| 2012/0182970 A1* | 7/2012 | Ding et al. | 370/331 |
| 2012/0327907 A1* | 12/2012 | Ding et al. | 370/331 |
| 2013/0170389 A1 | 7/2013 | Jee et al. | |
| 2013/0230036 A1* | 9/2013 | Reznik et al. | 370/338 |
| 2013/0288668 A1* | 10/2013 | Pragada et al. | 455/426.1 |

OTHER PUBLICATIONS

H. Park, J. Jee, H. Chan, D. Liu, "New Protocol Header for IEEE 802.21c", 21/12/0065-0o-srho-new-protocol-header-for-ieee-802.21c, IEEE, May 16, 2012, entire document.*

H. Chan, J. Jee, C. Perkins, H. Park, D. Liu, Y. Ohba, "TGc Proposal Hyunho Park", IEEE 802.21c draft, IEEE 802.21c: Single Radio Handover, www.ieee802.org/21, May 17, 2012, entire document.*

H. Chan, J. Jee, C. Perkins, H. Park, D. Liu, Y. Ohba, "TGc Proposal Charles Perkins", IEEE 802.21c draft, IEEE 802.21c: Single Radio Handover, www.ieee802.org/21, Jun. 5, 2012, entire document.*

IEEE Standard for Local and metropolitan area networks—Part 21: Media Independent Handover Services, Amendment 3: Optimized Single Radio Handovers, IEEE Computer Society, IEEE Std 802.21c-2014, Jun. 2014, 76 pages.

"IEEE P802.21c/D04 Draft Standard for Local and Metropolitan Area Networks—Part 21: Media Independent Handover Services Amendment 3: Optimized Single Radio Handovers," IEEE P80221c/D04, Jun. 2013, pp. 1-75.

Notification of Transmittal of the International Search Report and the Written Opinion of the International Searching Authority, or the Declaration received in Application No. PCT/CN2013/079144, mailed Oct. 13, 2013, 13 pages.

"IEEE P802.21c /D03 Draft Standard for Local and Metropolitan Area Networks—Part 21: Media Independent Handover Services Amendment 3: Optimized Single Radio Handovers", IEEE P802.21c/D03, Apr. 27, 2013, pp. 1-73.

Partial Supplementary European Search Report received in European Application No. 13817558.3 dated Jun. 25, 2015, 8 pages.

Liu, D. et al., "IEEE 802.21c Proposal: Single Radio Handover," 21-10-0228-03-srho-TGc_proposal_Dapeng_Liu.Doc, Jul. 11, 2011, 20 pages.

* cited by examiner

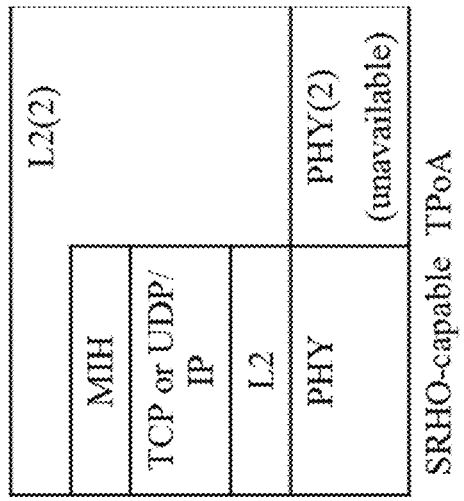
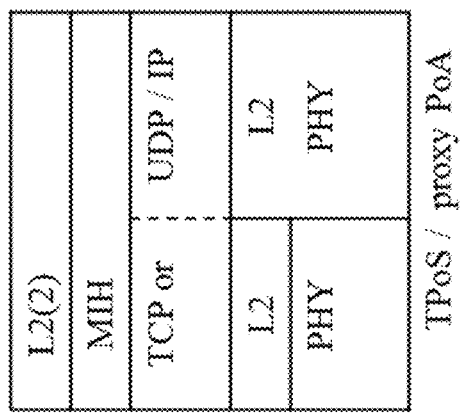
FIG. 5
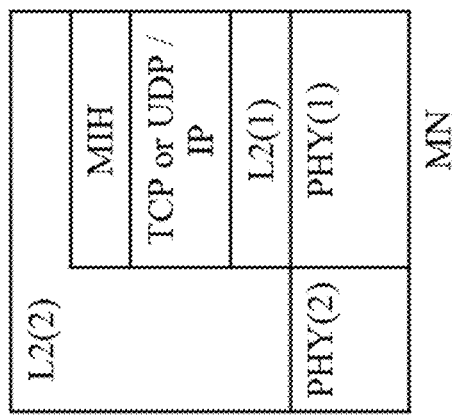

| Primitives | Service category | Description |
|---|---|---|
| Link_IF_TurnOn | Command | Turn on the network interface |
| Link_IF_TurnOff | Command | Turn off the network interface |

| Primitives | Service category | Description |
|---|---|---|
| MIH_IF_TurnOn | Command | Turn on the network interface |
| MIH_IF_TurnOff | Command | Turn off the network interface |

(1) MIH_Get_Information request
    : Send the location information (IE_MN_LOCATION) of the MN

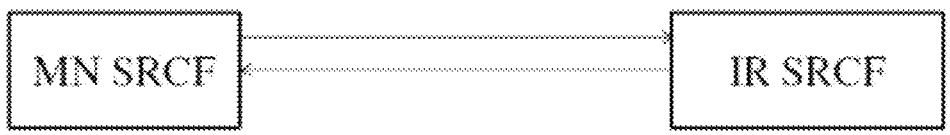

(2) MIH_Get_Information response
    : Respond with network access information
      (IE_NETWORK_TYPE, IE_NET_FREQUENCY_BANDS, etc.)

*FIG. 10*

(1) MIH_Get_Information request
    : Send the time information (IE_MN_TIME) of the MN

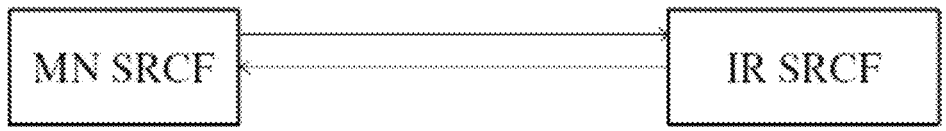

(2) MIH_Get_Information response
    : Respond with network access information
      (IE_NETWORK_TYPE, IE_NET_FREQUENCY_BANDS, etc.)

*FIG. 11*

| Name of information element or container | Description |
|---|---|
| IE_MN_LOCATION | Geographical location of the mobile node. Multiple location types are supported including coordinate-based location information, civic address, and cell ID. |
| IE_MN_TIME | Scheduled event time of the mobile node. Location and access network information can be coupled with time information. |

*FIG. 12*

| Primitives | Service category | Description |
|---|---|---|
| Link_IF_PreReg_Ready | Command | Prepare pre-registration of the target network interface |
| Link_Power_Query | Command | Query power consumption of the dedicated link interface |

| Primitives | Service category | Description |
|---|---|---|
| MIH_IF_PreReg_Ready | Command | Prepare pre-registration of the target network interface |
| MIH_Power_Query | Command | Query power consumption of the dedicated link interface |

*FIG. 17*

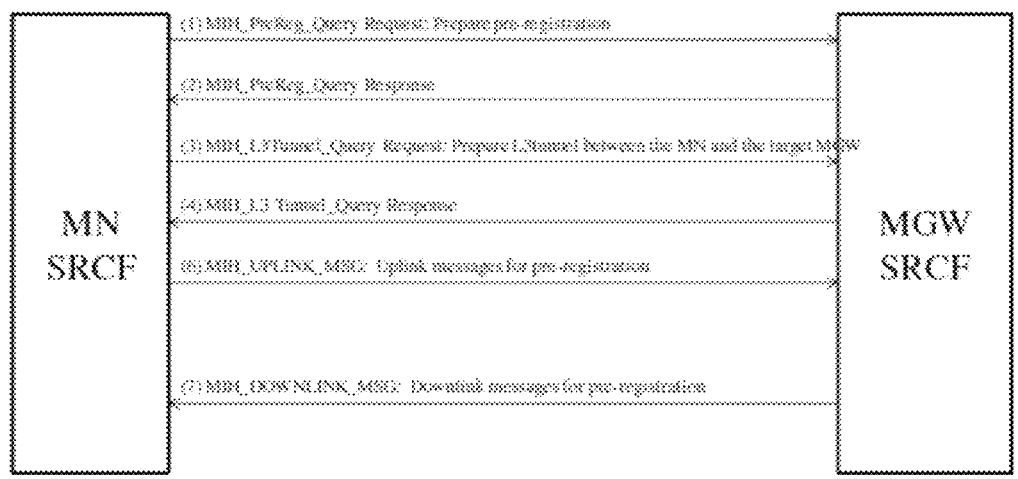

*FIG. 18*

| Primitives | Service category | Description |
|---|---|---|
| Link_UPLINK_PDU | L2frame | Transport the target radio L2 uplink frame |
| Link_DOWNLINK_PDU | L2frame | Transport the target radio L2 downlink frame |

*FIG. 19*

| Primitives | Service category | Description |
|---|---|---|
| MIH_PreReg_Query | Command | Query pre-registration for the target network<br>- This primitive helps the MN not exchange unnecessary L2 messages |
| MIH_L3Tunnel_Query | Command | Query setting for the tunnel between the MN and the MGW |
| MIH_UPLINK_PDU | Command | Transport the target radio L2 uplink frame |
| MIH_DOWNLINK_PDU | Command | Transport the target radio L2 downlink frame |

*FIG. 20*

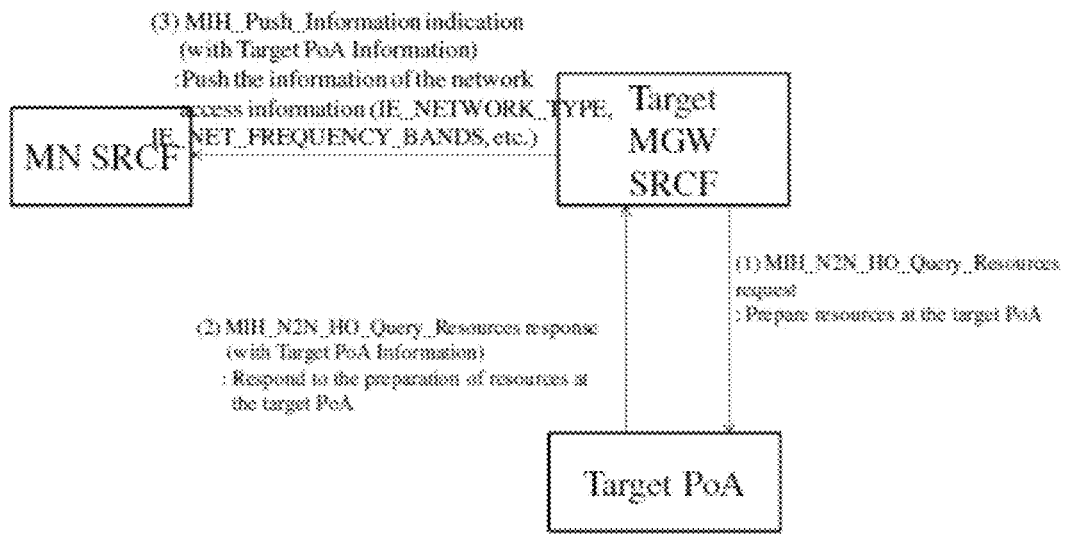

*FIG. 21*

SYSTEM AND METHOD FOR SINGLE RADIO HANDOVER

This application claims the benefit of U.S. Provisional Application No. 61/669,966 filed on Jul. 10, 2012 entitled "System and Method for Single Radio Handover," which is incorporated herein by reference as if reproduced in its entirety.

TECHNICAL FIELD

The present invention relates to a system and method for wireless communications, and, in particular embodiments, to a system and method for single radio handover.

BACKGROUND

Modern day mobile devices may have the capability to communicate using multiple communication protocols. For example, a mobile device may be able to communicate with a third generation partnership project (3GPP) long term evolution (LTE) cellular network as well as a wireless local area network (WLAN) that operates in accordance with a Wi-Fi Alliance protocol. Typically, a different radio interface will be used for each protocol, with each respective radio interface including a transmitter and a receiver that are specifically configured to communicate using the corresponding protocol.

In some situations, it may be desirable to handover a mobile device between heterogonous access networks. For example, a mobile station may want to be handed over from a 3GPP LTE network to a WLAN upon roaming into a Wi-Fi hotspot. Traditional handover techniques use the mobile device to relay handover signaling (e.g., messaging to de-register/re-register IP addresses, etc.) from the source network to the target network, which requires the mobile device to establish radio connections with both networks at the same time. Accordingly, mobile devices executing a traditional handover between heterogonous networks may be required to simultaneously power transmitters in the source and target radio interfaces. Notably, powering multiple transmitters at the same time may reduce battery life as well as increase peak power requirements of the mobile device. Accordingly, techniques and mechanisms for achieving a single radio handover between heterogonous networks are desired.

SUMMARY

Technical advantages are generally achieved, by embodiments of this disclosure which describe systems and methods for single radio handover.

In accordance with an embodiment, a method for performing single radio handover is provided. In this example, the method includes establishing a source radio link between a source radio interface of a mobile node and a source network in accordance with a first communications protocol. The source radio interface includes a source transmitter and a source receiver that are configured to communicate in accordance with the first communications protocol when activated. The method further includes activating a target receiver in a target radio interface of the mobile node without activating a target transmitter in the target radio interface of the mobile node. The target receiver and the target transmitter are configured to communicate in accordance with a second communications protocol when activated. The method further includes discovering a target network by detecting a transmission using the target receiver. An apparatus for performing this method is also provided.

In accordance with another embodiment, a method for performing single radio handover is provided. In this example, the method includes establishing a source radio link between a mobile node and a source network in accordance with a first communications protocol, and communicating handover signaling over the source radio link to achieve pre-registration of a target radio link. The target radio link is to be established between the mobile node and a target network in accordance with a second communications protocol. The handover signaling specifies a delay period for handing over the mobile node from the source network to the target network. The method further includes terminating the source radio link upon expiration of the delay period, and establishing the target radio link after terminating the source radio link. An apparatus for performing this method is also provided.

In accordance with yet another embodiment, a method for achieving link preregistration during single radio handover (SRHO) is provided. In this example, the method includes encapsulating a target network layer two (L2) handover frame into a media independent handover (MIH) frame. The target L2 handover frame includes information corresponding to preregistration of a target radio link to be established over a target radio interface of a mobile node (MN). The method further includes sending the MIH frame over a source radio interface of the MN. The MIH frame is relayed by a source network to a target network.

BRIEF DESCRIPTION OF THE DRAWINGS

For a more complete understanding of the present invention, and the advantages thereof, reference is now made to the following descriptions taken in conjunction with the accompanying drawing, in which:

FIG. 5 illustrates a diagram of more embodiment MIHF frame formats;

FIG. 10 illustrates a protocol diagram of an embodiment messaging sequence for network discovery;

FIG. 11 illustrates a protocol diagram of embodiment messaging sequence for network discovery;

FIG. 12 illustrates a table of embodiment information elements;

FIG. 17 illustrates a table of additional embodiment handover decision messages;

FIG. 18 illustrates a protocol diagram of an embodiment authentication and pre-registration messaging sequence;

FIG. 19 illustrates a table of embodiment pre-registration messages;

FIG. 20 illustrates a table of additional embodiment pre-registration messages;

FIG. 21 illustrates a protocol diagram of an embodiment target link preparation messaging sequence

DETAILED DESCRIPTION OF ILLUSTRATIVE EMBODIMENTS

The making and using of embodiments of this disclosure are discussed in detail below. It should be appreciated, however, that this disclosure provides many applicable inventive concepts that can be embodied in a wide variety of specific contexts. The specific embodiments discussed are merely illustrative of specific ways to make and use the invention, and do not limit the scope of the invention.

Aspects of this disclosure provide techniques and mechanisms for achieving a single radio handover of a mobile node (MN) between heterogonous networks. One such technique allows a MN to activate a receiver of a target radio interface without activating a transmitter of the target radio interface, thereby allowing the MN to perform target network discovery while the transmitter of the target radio interface remains deactivated. Another technique allows the MN to perform link preparation/pre-registration for a future target radio link using the source radio link, thereby allowing the MN to prepare for establishment of the target radio link while the transmitter of the target radio interface remains deactivated. In one example, embodiments of this disclosure transport handover related signaling over a tunnel established through the source network. This allows the MN to achieve various handover related tasks (e.g., re-reregister the MN's IP address, obtain MN authorization/authentication, etc.) without activating the target radio link. Additional embodiments of this disclosure establish a schedule (or delay period) for synchronizing termination of the source radio link (e.g., deactivation of the source radio interface) with establishment of the target radio link (e.g., activation of the transmitter in the target radio interface). These and other techniques for facilitating single radio handover are described in greater detail below.

Figure 1:
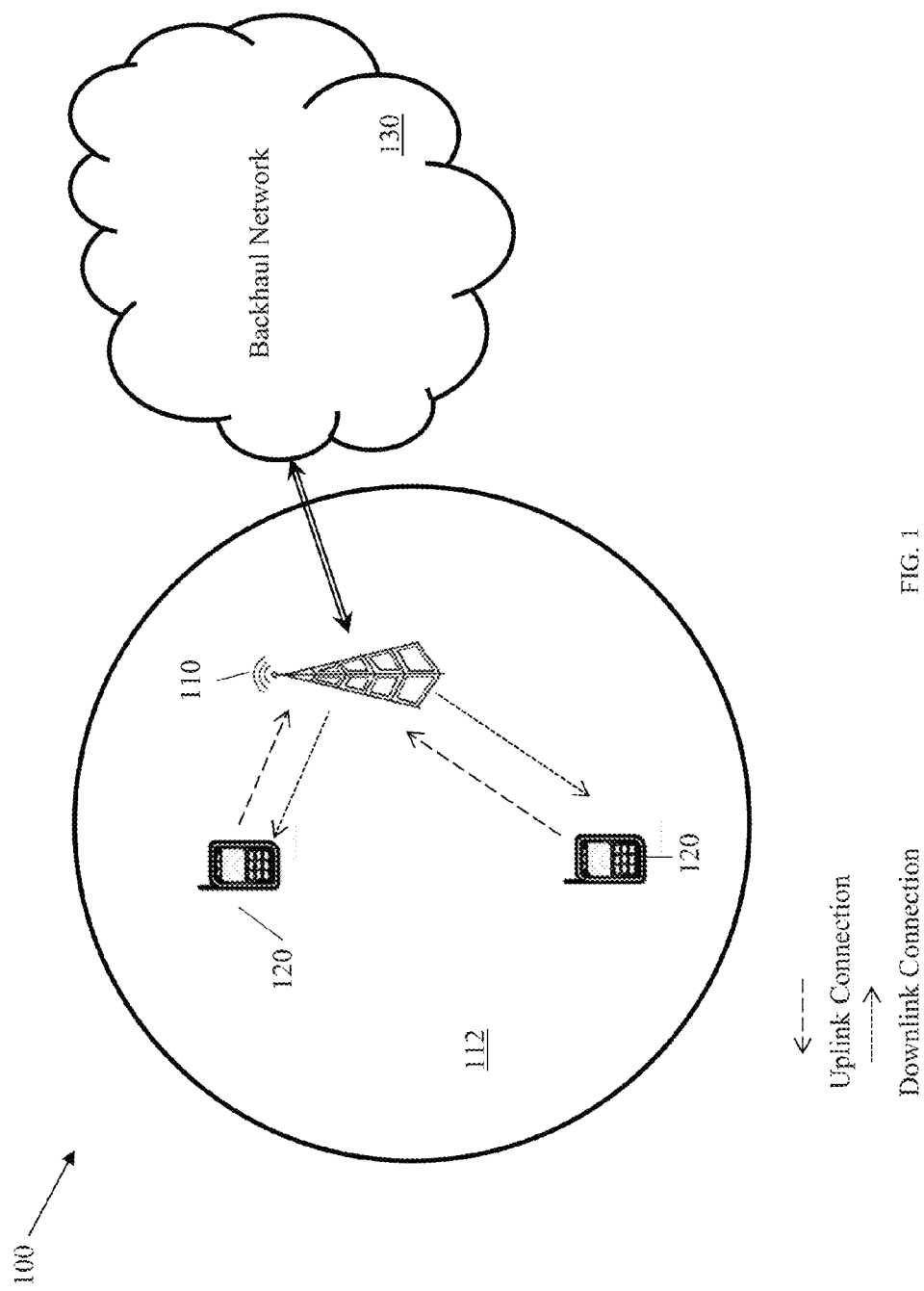
FIG. 1 illustrates a diagram of a wireless network for communicating data.

FIG. 1 illustrates a network 100 for communicating data. The network 100 comprises an access point (AP) 110 having a coverage area 112, a plurality of mobile nodes 120, and a backhaul network 130. The AP 110 may comprise any component capable of providing wireless access by, inter alia, establishing uplink (dashed line) and/or downlink (dotted line) connections with the mobile nodes 120, such as a base station, an enhanced base station (eNB), a femtocell, and other wirelessly enabled devices. The mobile nodes 120 may comprise any component capable of establishing a wireless connection with the AP 110, such as mobile stations (STAs), user equipments (UEs), etc.). The backhaul network 130 may be any component or collection of components that allow data to be exchanged between the AP 110 and a remote end (not shown). In some embodiments, the network 100 may comprise various other wireless devices, such as relays, femtocells, etc.

Figure 2:
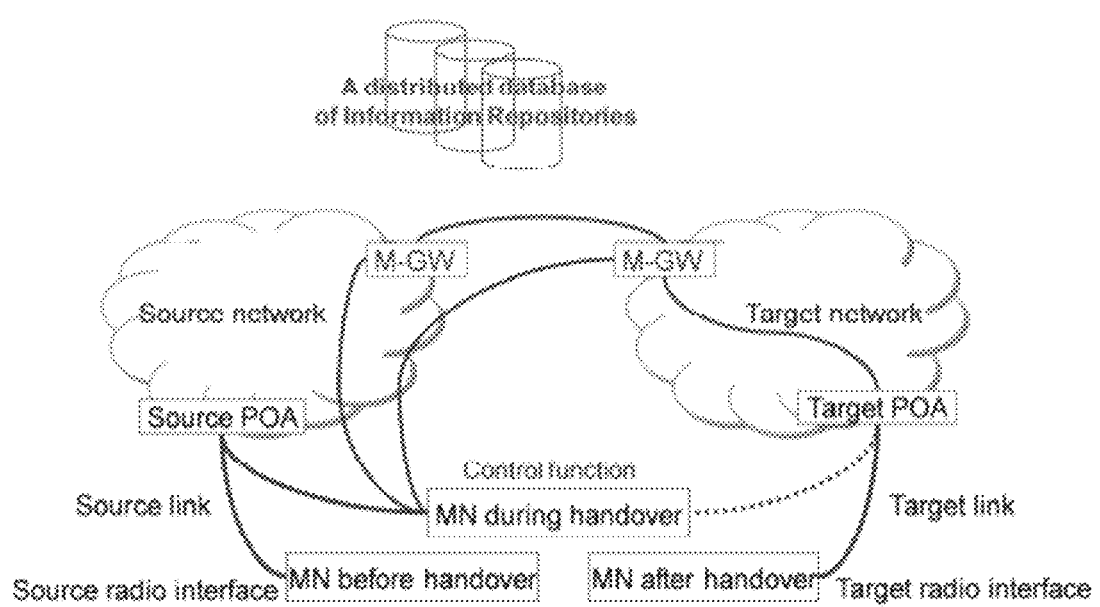
FIG. 2 illustrates a diagram of a network for achieving single radio handover.

FIG. 2 illustrates a network 200 configured for a single radio handover. During handover, the source link is established, but the target link is not available when the data transfer in the target link will cause radio frequency interference to the source link and when the resulting peak power consumption is too high. The mobile node (MN) therefore uses the source link to perform the handover signaling with the target network via the target network mobility gateway (MGW), or in addition via the target network mobility gateway.

Figure 3:
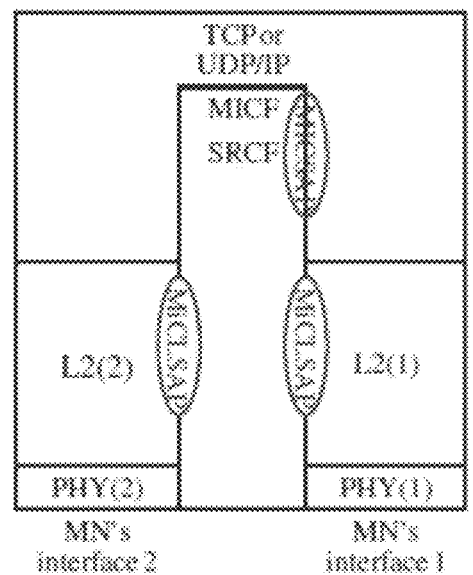
FIG. 3 illustrates a diagram of a media independent control (MIH) service access point (SAP) entity.
Figure 4:
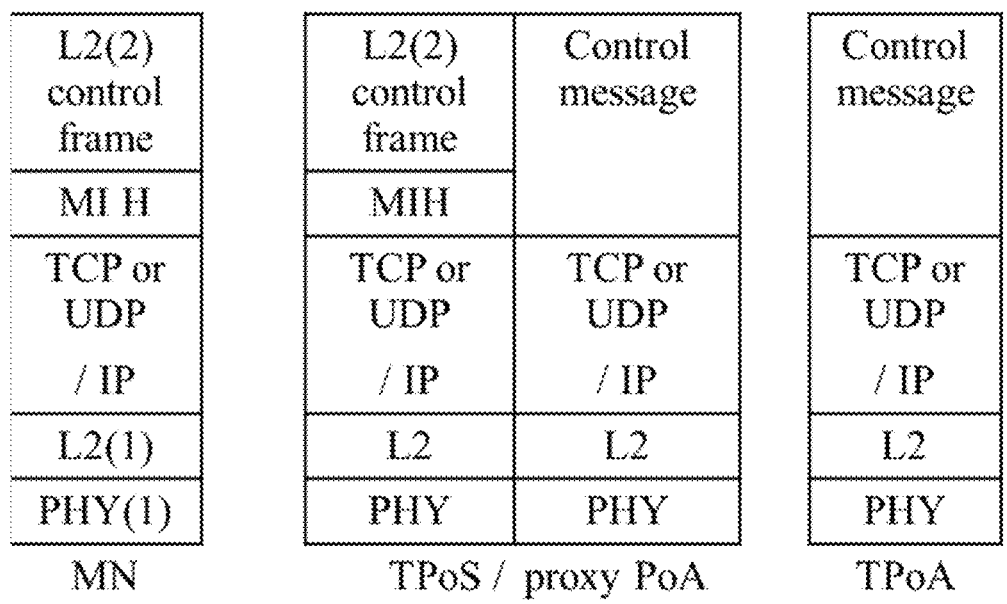
FIG. 4 illustrates a diagram of embodiment MIH function (MIHF) frame formats.

Aspects of this disclosure provide a service access point (SAP) for transporting messages across (or between) heterogeneous networks. FIG. 3 illustrates an embodiment media independent control SAP (MICSAP) between MICF and TCP or UDP/IP and the media independent control link SAP (MICLSAP) between Link layer and the SRCF. The IEEE 802.21c enabled node has a media independent control function (MICF) in which the single radio control function (SRCF) is implemented. Additional aspects of this disclosure provide embodiment media independent handover function (MIHF) frames, which may be used (e.g., in liu of MICSAPs) to transport messages across heterogeneous networks. More specifically, a link-layer frame may be encapsulated into a media independent handover function (MIHF) frame, which may then be is encapsulated into a TCP/UDP over IP packet prior to being transported across an intermediate link or network (e.g., an IP network) interconnecting the heterogeneous networks. The MIHF may be a type of MIC function supported by a target access point (AP) or proxy. Accordingly, a target AP or proxy may be configured to retrieve the MIFH frame by removing the TCP/UDP over IP header from the received packet. FIGS. 4 and 5 illustrate embodiment MIHF frame formats.

Figure 6:
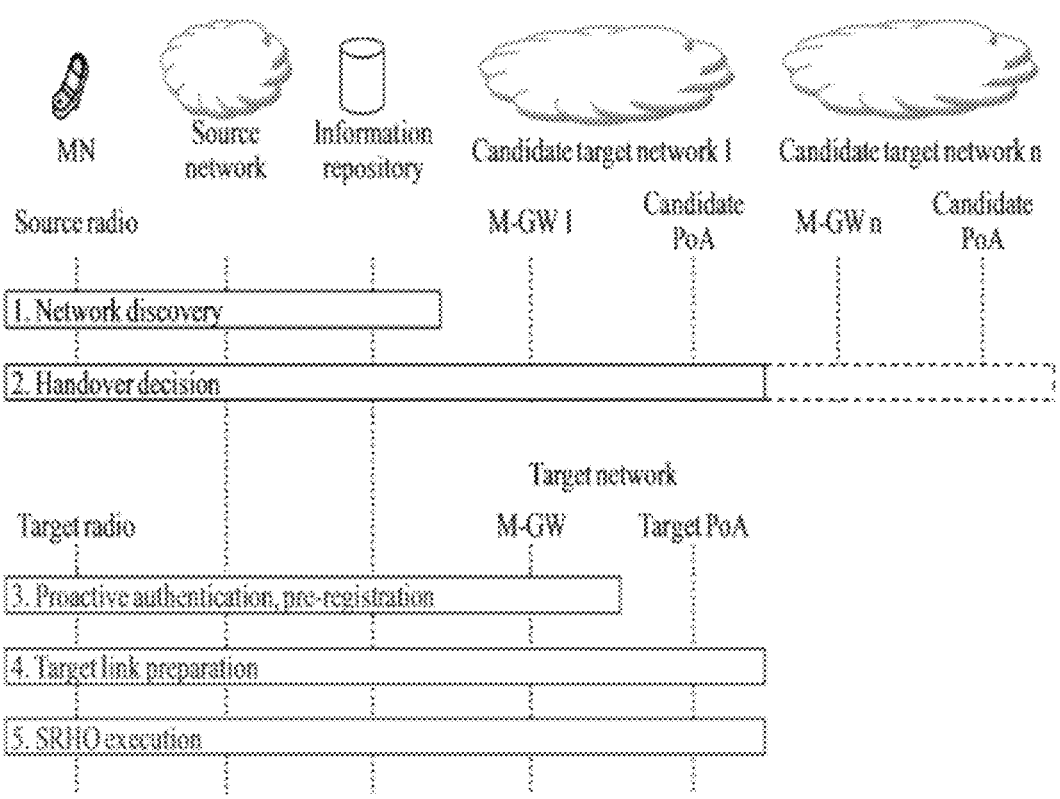
FIG. 6 illustrates a protocol diagram of a single radio handover procedure.

FIG. 6 illustrates a single radio handover procedure. As shown, the single radio handover procedure hands over a mobile node from a source network to a target network. Network discovery may be achieved when the MN detects a message (e.g., beacon, etc.) from one or more candidate access points (APs), which are also referred to as points of access (PoA). The Handover decision may occur when the MN elects to switch from the source network to the candidate network. The handover decision may be based on any relevant criteria, e.g., cost, quality of service (QoS), available bandwidth, etc. Signaling related to proactive authentication, target link pre-registration, and target link preparation can be transported over a tunnel extending through the source network, thereby allowing the MN and the target network to communicate without activating a target link. In some embodiments, this signaling may include layer two handover messaging that is encapsulated in media independent handover (MIH) messages as well as various primitives for requesting, establishing, and confirming pre-registration of the target radio link. Mobility gateways in the source network and the target network may be configured to process these messages. Finally, the single radio handover (SRHO) execution may occur when the mobile node synchronizes or otherwise coordinates a termination of the source radio link with an establishment of the target radio link. When implementing a single radio handover, the target radio link is generally not activated until after the source radio link has been terminated. Preparation to handover to the target network can be conducted by messaging with the target network via a mobility gateway. In some embodiments, the mobility gateway is a signaling proxy between the source the destination nodes, and can be configured to operate as a proxy service (PoS) (e.g., an MIFH PoS) in the source and/or target networks.

Embodiments of this disclosure may be implemented in mobile nodes with multiple interfaces such as 3GPP, WiMAX, 3GPP2, WLAN, etc., and in core network devices of 3GPP, WiMAX, 3GPP2, WLAN, and other wireless access networks. Embodiments of this disclosure include messages for turning on/off the network interface when possible, and messages to perform pre-registration for single radio handover. The header of these messages instruct the mobility gateways in the target network and the source network that these messages are used to carry out single radio handover.

Figures 7, 8, 9:
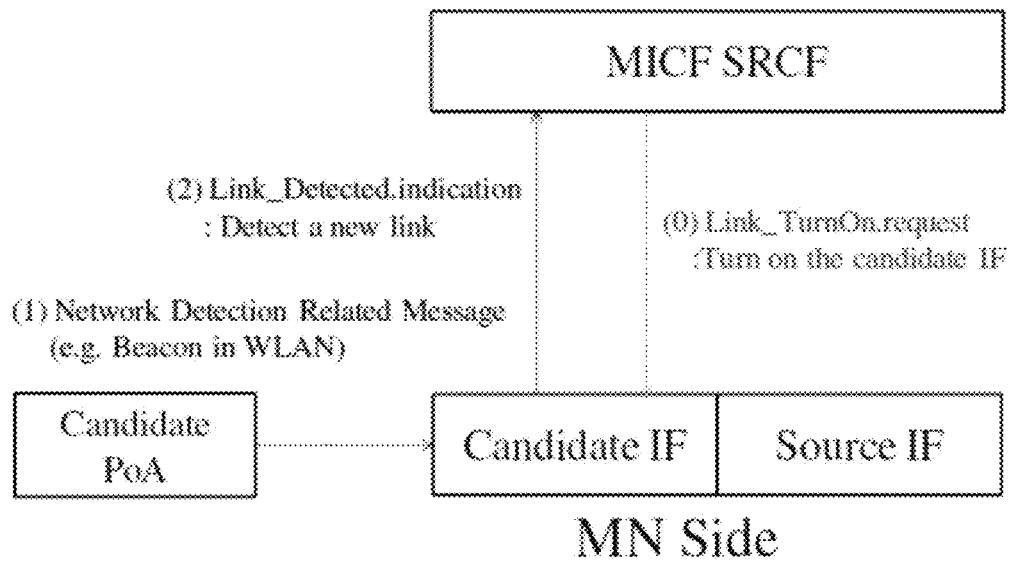
FIG. 7 illustrates a protocol diagram of a SAP command sequence.
FIG. 8 illustrates a table of embodiment SAP commands.
FIG. 9 illustrates a table of additional embodiment SAP commands.
Figure 13:
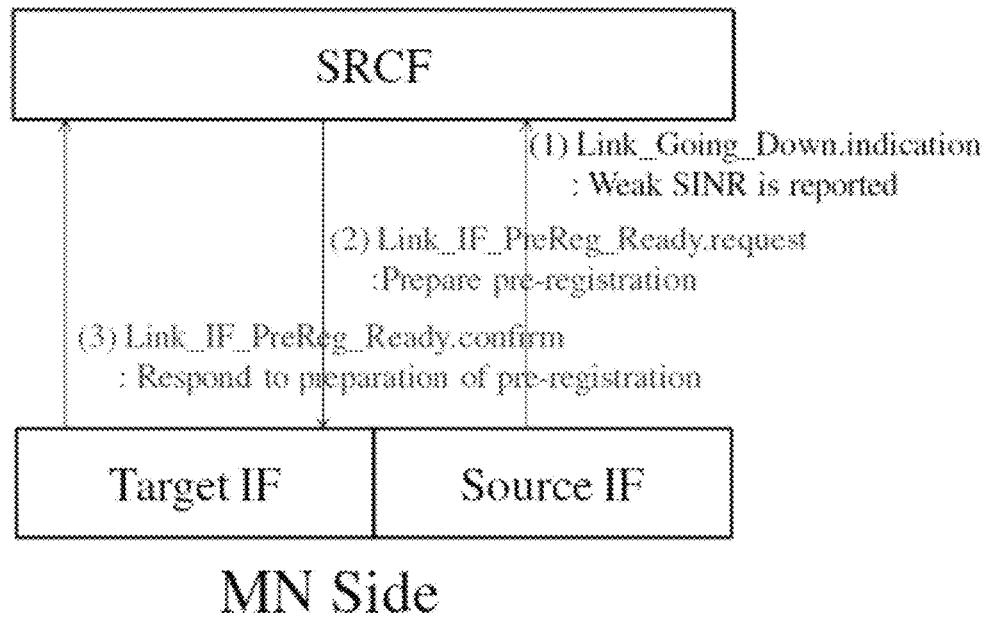
FIG. 13 illustrates a protocol diagram of an embodiment handover messaging sequence.

A first step in single radio handover may include discovery of a suitable target network by a MN. Discovery of a suitable target network can be achieved by listening to a target link or channel. In some implementations, MNs may be configured to listen to the target link or channel when doing so does not cause interference to the source link. FIG. 7 illustrates a protocol diagram of an embodiment messaging sequence for activating a receiver in a radio interface without activating a transmitter in the radio interface. As shown, an MIH control function (MICF) in the mobile node may send a link turn on request (Link_TurnOn.request) primitive to a candidate or target radio interface to activate a receiver in the target radio interface. In some embodiments, the Link_TurnOn.request primitive includes link receiver on (Link_RX_ON) action instructing the target radio to activate the target receiver without activating the target transmitter. In some embodiments, the Link_TurnOn.request primitive is encapsulated in a media independent handover (MIH) link service access point (SAP) primitive (MIH_LINK_SAP_primitive). FIG. 8 illustrates a table describing network discovery messages defined over MICLSAP. FIG. 9 illustrates a table describing network discovery messages defined over MICSAP.

Discovery of a suitable target network can also be achieved using location information of the MN, e.g., global positioning system (GPS) information, etc., as well as scheduling information of the MN. By way of example, a MN may be configured to remember that a WLAN is located in a user's workplace (or home), and consequently may be configured to attempt to discover the WLAN whenever the MN is at or near those respective locations/coordinates. Further, a MN may be configured to remember that a user is typically in a Wi-Fi hotspot (e.g., an office, etc.) during normal working hours (e.g., 9 am to 5 pm on weekdays), and consequently may periodically attempt WLAN discovery during those periods. Aspects of this disclosure provide embodiment IE_MN_LOCATION primitive for performing network discovery based on a MN's location, as well as an embodiment IE_MN_TIME primitive for performing network discovery based on scheduling information of the MN. FIGS. 8 and 9 illustrate how the IE_MN_LOCATION and IE_MN_TIME primitives can be included in messaging sequences between a MN single radio control function (SRCF) and an Information Repository (IR) SRCF. FIG. 12 illustrates a table describing the IE_MN_LOCATION and IE_MN_TIME primitives.

Although an MN may be unable to interact with a server that provides other network discovery mechanisms such as Access Network Query Protocol (ANQP) and Access Network Discovery and Selection Function (ANDSF), the MN may nevertheless interact with an MIH proxy server. To interact the MIH proxy, the MN and the MIH proxy can use messages that encapsulates other network discovery message such as ANQP and ANDSF messages with MIH frame. The message for encapsulation may be MIH_CTRL_Transfer. By using MIH_CTRL_Transfer message, the MN can discover a target network.

Figure 14:
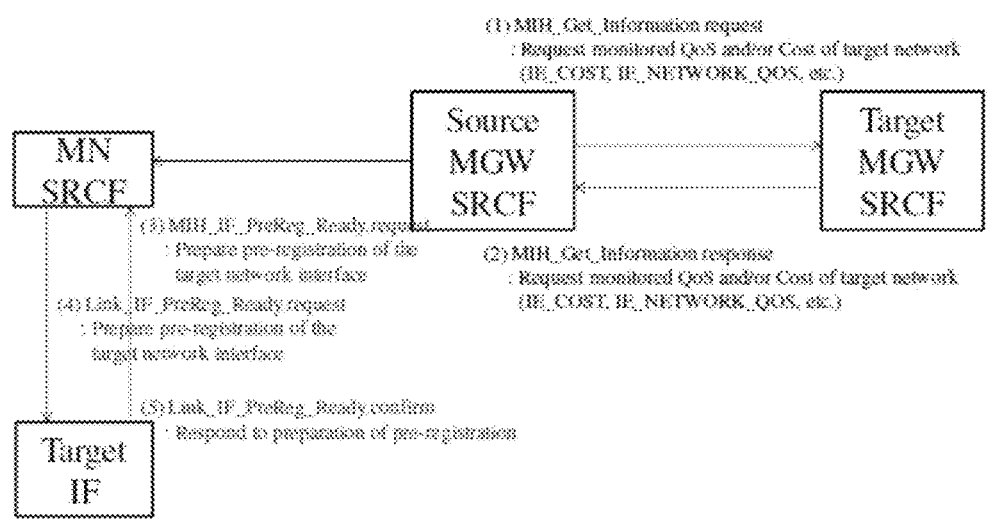
FIG. 14 illustrates a protocol diagram of another embodiment handover messaging sequence.
Figures 15, 16:
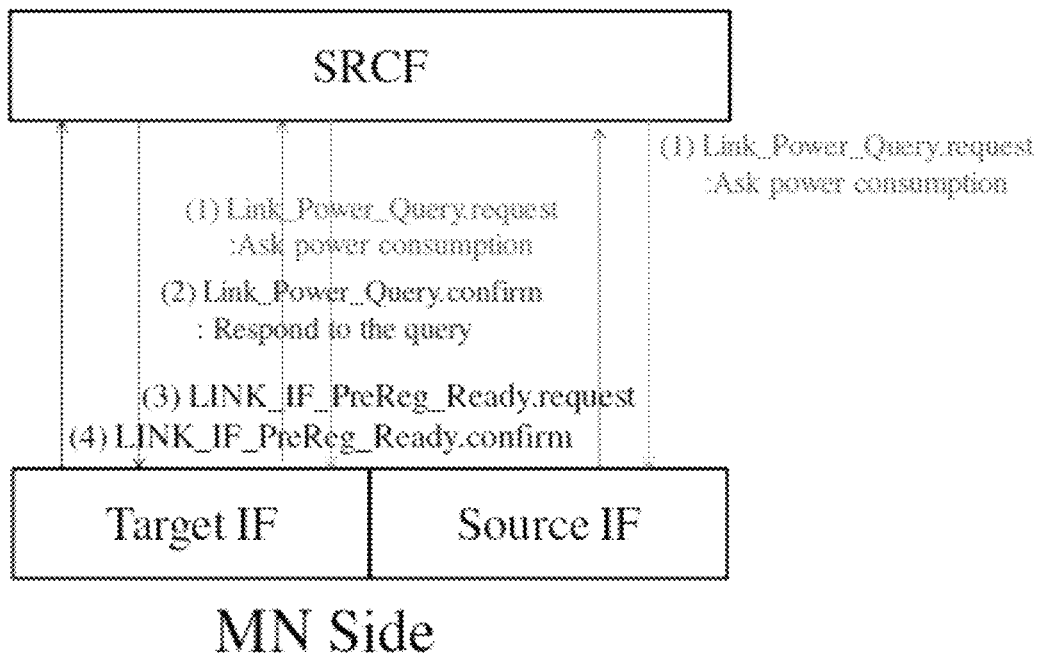
FIG. 15 illustrates a protocol diagram of yet another embodiment handover messaging sequence.
FIG. 16 illustrates a table of embodiment handover decision messages.

Another step in single radio handover may include making a handover decision. Handover decisions can be performed using signal to interference noise ratio (SINR) of a source link (or an estimated SINR of a potential target link). Handover decisions may also be based on whether the source or target network is capable of offering a better quality of service (QoS), wireless access at a reduced cost, or wireless access at a reduced MN power consumption. FIG. 12 illustrates a messaging sequence for performing a handover decision based on a SINR of a source link. FIG. 14 illustrates a messaging sequence for performing a handover decision based on a QoS and/or cost parameter. FIG. 15 illustrates a messaging sequence for performing a handover decision based on an MN power consumption. FIG. 16 illustrates a table describing handover decision messages exchanged via an MICLSAP. FIG. 17 illustrates a table describing handover decision messages exchanged via an MICSAP.

In some embodiments, single radio handover may include proactive authentication of the MN in target network as well as a pre-registration of the target radio link. The signaling for these operations can be transported over a tunnel extending from the source radio interface of the MN to a proxy or target access point in the target network. The tunnel may extend through the source network, and may exclude the target radio link such that the operations can take place prior to activation of the target radio link. FIG. 18 illustrates a messaging sequence for achieving proactive authentication and pre-registration. As shown, the messaging sequence takes place between a MN SRCF and a MGW SRCF. FIG. 19 illustrates a table describing pre-registration messages exchanged via an MICLSAP. FIG. 20 illustrates a table describing pre-registration messages exchanged via an MICSAP.

Another step in single radio handover may include target link preparation. FIG. 21 illustrates a messaging sequence for achieving target link preparation. As shown, SRHO execution activates the target network interface and to perform communication to the target network.

Figure 22:
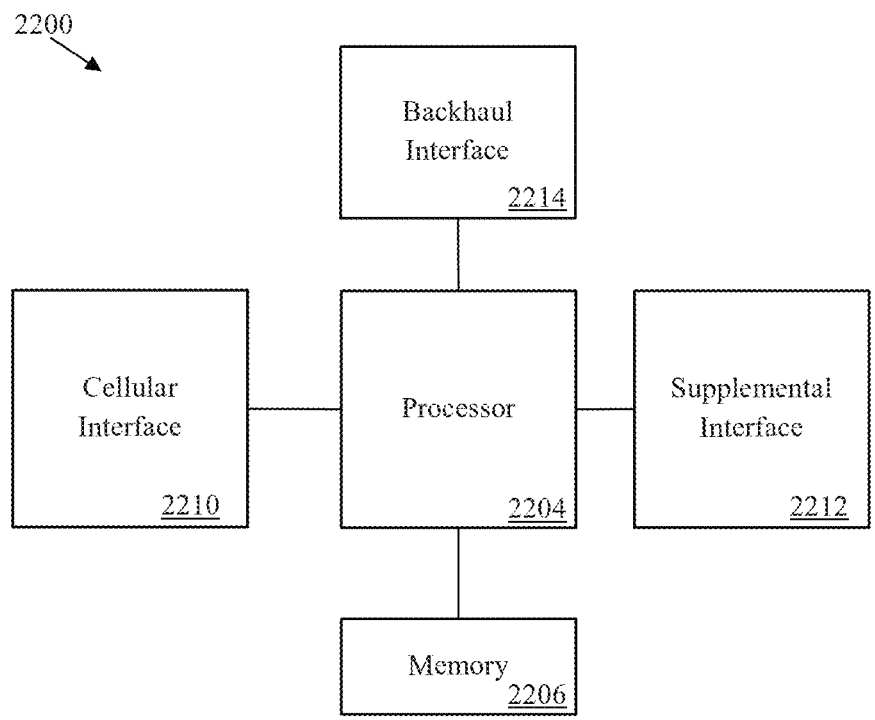
FIG. 22 illustrates a diagram of an embodiment communications device.

FIG. 22 illustrates a block diagram of an embodiment of a communications device 2200, which may be equivalent to one or more devices (e.g., UEs, NBs, etc.) discussed above. The communications device 2200 may include a processor 2204, a memory 2206, a cellular interface 2210, a supplemental interface 2212, and a backhaul interface 2214, which may (or may not) be arranged as shown in FIG. 22. The processor 2204 may be any component capable of performing computations and/or other processing related tasks, and the memory 2206 may be any component capable of storing programming and/or instructions for the processor 2204. The cellular interface 2210 may be any component or collection of components that allows the communications device 2200 to communicate using a cellular signal, and may be used to receive and/or transmit information over a cellular connection of a cellular network. The supplemental interface 2212 may be any component or collection of components that allows the communications device 2200 to communicate data or control information via a supplemental protocol. For instance, the supplemental interface 2212 may be a non-cellular wireless interface for communicating in accordance with a Wireless-Fidelity (Wi-Fi) or Bluetooth protocol. Alternatively, the supplemental interface 2212 may be a wireline interface. The backhaul interface 2214 may be optionally included in the communications device 2200, and may comprise any component or collection of components that allows the communications device 2200 to communicate with another device via a backhaul network.

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

Figure 23:
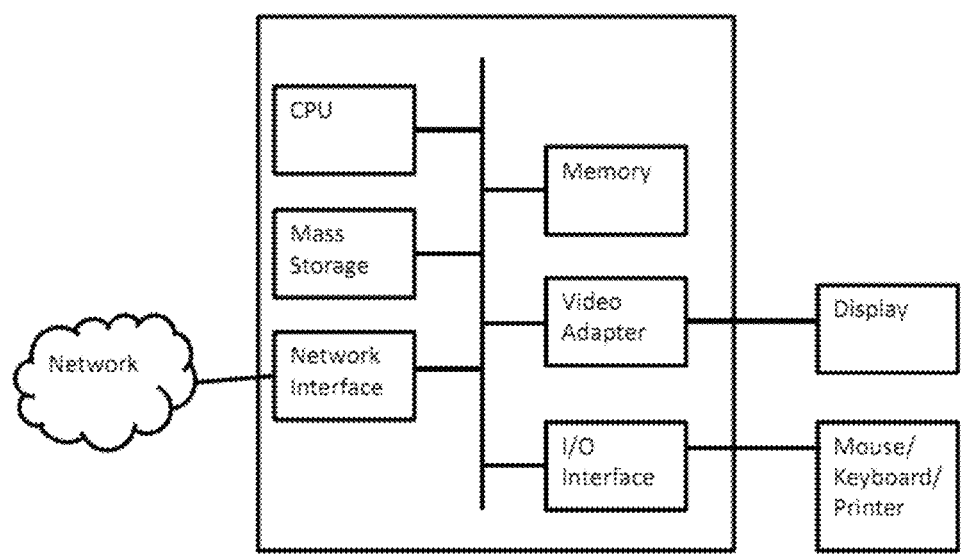
FIG. 23 illustrates a diagram of an embodiment computing platform.

FIG. 23 is a block diagram of a processing system that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system may comprise a processing unit equipped with one or more input/output devices, such as a speaker, microphone, mouse, touchscreen, keypad, keyboard, printer, display, and the like. The processing unit may include a central processing unit (CPU), memory, a mass storage device, a video adapter, and an I/O interface connected to a bus.

The bus may be one or more of any type of several bus architectures including a memory bus or memory controller, a peripheral bus, video bus, or the like. The CPU may comprise any type of electronic data processor. The memory may comprise any type of system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

The mass storage device may comprise any type of storage device configured to store data, programs, and other information and to make the data, programs, and other information accessible via the bus. The mass storage device may comprise, for example, one or more of a solid state drive, hard disk drive, a magnetic disk drive, an optical disk drive, or the like.

The video adapter and the I/O interface provide interfaces to couple external input and output devices to the processing unit. As illustrated, examples of input and output devices include the display coupled to the video adapter and the mouse/keyboard/printer coupled to the I/O interface. Other devices may be coupled to the processing unit, and additional or fewer interface cards may be utilized. For example, a serial interface such as Universal Serial Bus (USB) (not shown) may be used to provide an interface for a printer.

The processing unit also includes one or more network interfaces, which may comprise wired links, such as an Ethernet cable or the like, and/or wireless links to access nodes or different networks. The network interface allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for performing single radio handover, the method comprising:
    establishing a source radio link between a source radio interface of a mobile node and a source network in accordance with a first communications protocol, wherein the source radio interface includes a source transmitter and a source receiver that are configured to communicate in accordance with the first communications protocol when activated;
    activating, by the mobile node, a target receiver in a target radio interface of the mobile node without activating a target transmitter in the target radio interface of the mobile node, wherein the target receiver and the target transmitter are configured to communicate in accordance with a second communications protocol when activated;
    discovering, by the mobile node, a target network by detecting a target network transmission using the activated target receiver, wherein the target transmitter remains deactivated until after the target network transmission is detected by the activated target receiver;
    communicating handover signaling to a target access point in the target network, the handover signaling specifying a delay period for handing the mobile node from the source network to the target network, wherein the target transmitter remains inactive when communicating the handover signaling to the target access point;
    terminating the source radio link upon expiration of the delay period; and
    activating, by the mobile node, the target transmitter of the target radio interface after terminating the source radio link.

2. The method of claim 1, further comprising:
    establishing a tunnel for communicating handover related signaling from the mobile node to a target access point in the target network, wherein the tunnel extends at least partially through the source network, and wherein the handover signaling is communicated from the mobile node to the target access point via the tunnel.

3. The method of claim 2, wherein the handover signaling comprises link pre-registration information for a target radio link to be established between the mobile node and the target network.

4. The method of claim 1, wherein activating the target transmitter establishes a target radio link between the target radio interface of the mobile node and the target network.

5. The method of claim 1, wherein activating the target receiver in the target radio interface of the mobile node without activating the target transmitter in the target radio interface of the mobile node comprises:
    sending, by a media independent handover function (MIHF) of the mobile node, a media independent handover (MIH) link service access point (SAP) primitive (MIH_LINK_SAP_primitive) to the target radio interface of the mobile node, the MIH_LINK_SAP_primitive carrying a link receiver on (Link_RX_ON) action instructing the target radio interface to activate the target receiver without activating the target transmitter.

6. A mobile node comprising:
    a source radio interface comprising a source transmitter and a source receiver that are configured to communicate in accordance with a first communications protocol when activated;

a target radio interface comprising a target transmitter and a target receiver that are configured to communicate in accordance with a second communications protocol when activated; and a processor configured to establish a first radio link between the source radio interface and a source network, to activate the target receiver without activating the target transmitter, to discover a target network by detecting a target network transmission using the activated target receiver, to communicate, to the target network, handover signaling that specifies a delay period for handing the mobile node from the source network to the target network, to terminate the first radio link upon expiration of the delay period, and to activate the target transmitter of the target radio interface after terminating the first radio link, wherein the target transmitter remains deactivated until after the target network transmission is detected by the activated target receiver.

7. The mobile node of claim 6, wherein the processor is further configured to establish a tunnel from the mobile node to a target access point in the target network, wherein the handover signaling is communicated from the mobile node to the target access point via the tunnel, and wherein the target transmitter remains inactive when communicating the handover signaling to the target access point.

8. The mobile node of claim 6, wherein activating the target transmitter establishes a target radio link between the target radio interface of the mobile node and the target network.

9. A method for performing single radio handover, the method comprising:
establishing a source radio link between a mobile node and a source network in accordance with a first communications protocol;
communicating, by the mobile node, handover signaling over the source radio link to achieve pre-registration of a target radio link, the target radio link to be established between the mobile node and a target network in accordance with a second communications protocol, the mobile node including a target transmitter configured to communicate in accordance with a second communications protocol when activated, wherein the handover signaling specifies a delay period for handing over the mobile node from the source network to the target network, and wherein the target transmitter remains deactivated during the delay period;
terminating, by the mobile node, the source radio link upon expiration of the delay period; and
establishing, by the mobile node, the target radio link after terminating the source radio link.

10. The method of claim 9, wherein communicating the handover signaling over the source radio link comprises:
communicating, by the mobile node, the handover signaling over a tunnel extending from the source radio link to the target network, wherein the tunnel extends at least partially through the source network.

11. The method of claim 9, wherein communicating the handover signaling over the source radio link comprises:
forwarding a link layer handover message over a tunnel to a proxy server in the source network, wherein the proxy server encapsulates the link layer handover message into a media independent handover (MIH) frame, encapsulates the MIH frame into a transport control protocol (TCP)/user datagram protocol (UDP) over internet protocol (IP) frame, and forwards the TCP/UDP over IP frame to a proxy server or access point in the target network.

12. The method of claim 9, wherein communicating the handover signaling over the source radio link comprises:
encapsulating a link layer handover message within a media independent handover (MIH) frame; and
forwarding the MIH frame over a tunnel to a proxy server in the source network, wherein the proxy server encapsulates the MIH frame into a transport control protocol (TCP)/user datagram protocol (UDP) over internet protocol (IP) frame and forwards the TCP/UDP over IP frame to proxy server or access point in the target network.

13. The method of claim 9, wherein communicating the handover signaling over the source radio link comprises:
encapsulating, by the mobile node, a link layer handover message within a media independent handover (MIH) frame;
encapsulating, by the mobile node, the MIH frame into a transport control protocol (TCP)/user datagram protocol (UDP) over internet protocol (IP) frame; and
forwarding the TCP/UDP over IP frame over a tunnel to proxy server or access point in the target network.

14. The method of claim 9, wherein establishing the target radio link after terminating the source radio link comprises activating the target transmitter to establish the target radio link.

15. A mobile node comprising:
a processor; and
a non-transitory computer readable storage medium storing programming for execution by the processor, the programming including instructions to:
establish a source radio link between the mobile node and a source network in accordance with a first communications protocol;
communicate handover signaling over the source radio link to achieve pre-registration of a target radio link, the target radio link to be established between the mobile node and a target network in accordance with a second communications protocol, the mobile node including a target transmitter configured to communicate in accordance with a second communications protocol when activated, wherein the handover signaling specifies a delay period for handing over the mobile node from the source network to the target network, and wherein the target transmitter remains deactivated during the delay period;
terminate the source radio link upon expiration of the delay period; and
establish the target radio link after terminating the source radio link.

16. The mobile node of claim 15, wherein the instructions to communicate the handover signaling over the source radio link includes instructions to:
communicate the handover signaling over a tunnel extending from the source radio link to the target network, wherein the tunnel extends at least partially through the source network.

17. A method for achieving link preregistration during single radio handover (SRHO), the method comprising:
encapsulating an Access Network Query Protocol (ANQP) or Access Network Discovery and Selection Function (ANDSF) message into a media independent handover (MIH) frame, wherein the ANQP or ANDSF includes information corresponding to preregistration of a target radio link to be established over a target radio interface of a mobile node (MN); and sending the MIH frame over a source radio interface of the MN, wherein the MIH frame is relayed by a source network to a target network.

18. The method of claim 17 further comprising:
receiving, by a media independent handover function (MIHF) of the MN, a media independent handover (MIH) link preregistration ready request (MIH_Prereg_Ready.request) primitive from a proxy server, wherein the MIH_Prereg_Ready.request primitive includes an execution delay parameter specifying a delay period for activating the target radio interface of the MN.

19. The method of claim 18 further comprising:
transmitting, by the MIHF of the MN, an MIH link preregistration ready confirm (MIH_Prereg_Ready.confirm) primitive to the target MIHF over a tunnel extending through a source access network, wherein the MIH_Prereg_Ready.confirm primitive indicates the status of preregistration on the target radio link.

20. The method of claim 17, further comprising:
receiving, by the MN, a link preregistration ready request (Link_Prereg_Ready.request) primitive from the target network, wherein the Link_Prereg_Ready.request primitive includes an execution delay parameter specifying a delay period for activating the target radio interface of the MN.

21. The method of claim 20 further comprising:
transmitting, by the MN, a link preregistration ready confirmation (Link_Prereg_Ready.confirm) primitive to the target network, wherein the Link_Prereg_Ready.confirm primitive indicates the status of preregistration on the target radio link.

22. The method of claim 17, wherein encapsulating the ANQP or ANDSF message into the MIH frame comprises:
encapsulating an ANQP message into the MIH frame.

23. The method of claim 17, wherein encapsulating the ANQP or ANDSF message into the MIH frame comprises:
encapsulating an ANDSF message into the MIH frame.

\* \* \* \* \*